(12) United States Patent
Wang et al.

(10) Patent No.: US 12,316,132 B2
(45) Date of Patent: May 27, 2025

(54) MEDICAL DEVICE WIRELESS CHARGING SYSTEM

(71) Applicant: Covidien LP, Mansfield, MA (US)

(72) Inventors: Li Wang, Shanghai (CN); Chunlei Hou, Shanghai (CN); Mingxia Sun, Shanghai (CN)

(73) Assignee: Covidien LP, Mansfield, MA (US)

( * ) Notice: Subject to any disclaimer, the term of this patent is extended or adjusted under 35 U.S.C. 154(b) by 199 days.

(21) Appl. No.: 18/040,135

(22) PCT Filed: Aug. 28, 2020

(86) PCT No.: PCT/CN2020/112037
§ 371 (c)(1),
(2) Date: Jan. 31, 2023

(87) PCT Pub. No.: WO2022/041105
PCT Pub. Date: Mar. 3, 2022

(65) Prior Publication Data
US 2023/0327488 A1  Oct. 12, 2023

(51) Int. Cl.
*H01F 27/28* (2006.01)
*H02J 50/00* (2016.01)
*H02J 50/10* (2016.01)

(52) U.S. Cl.
CPC .......... *H02J 50/10* (2016.02); *H01F 27/2871* (2013.01); *H02J 50/005* (2020.01)

(58) Field of Classification Search
CPC .......... H02J 50/10; H02J 50/005; H02J 50/12; H02J 50/402; H02J 50/00; H01F 27/2871; H01F 27/2823; H01F 27/361; H01F 38/14; H01F 27/28; Y02E 60/10

USPC .......................................................... 307/104
See application file for complete search history.

(56) References Cited

U.S. PATENT DOCUMENTS

| | | | |
|---|---|---|---|
| 2008/0007211 A1 | 1/2008 | Poisner | |
| 2017/0085103 A1* | 3/2017 | Seng | H05K 5/0278 |
| 2018/0233965 A1 | 8/2018 | Peralta et al. | |
| 2019/0115787 A1 | 4/2019 | Muratov et al. | |

FOREIGN PATENT DOCUMENTS

| | | | |
|---|---|---|---|
| CN | 103460556 A | | 12/2013 |
| CN | 107005071 A | | 8/2017 |
| CN | 108377036 | * | 8/2018 |

(Continued)

OTHER PUBLICATIONS

International Search Report for International Application No. PCT/CN2020/112037 mailed May 26, 2021 (2 pages).

(Continued)

*Primary Examiner* — Elim Ortiz
*Assistant Examiner* — Xuan Ly

(57) ABSTRACT

A wireless charging system for charging batteries (112) in a medical environment is provided. The wireless charging system may include a power transmitter and a power receiver. The power transmitter produces a strong near-distance magnetic field and transmits the magnetic field via a transmitting antenna to a power receiver. The power receiver may receive the transmitted magnetic field via a power receiver antenna. The converted electrical power may charge multiple rechargeable batteries (112) simultaneously with high efficiency.

20 Claims, 7 Drawing Sheets

(56) References Cited

FOREIGN PATENT DOCUMENTS

| | | | |
|---|---|---|---|
| CN | 108377036 A | | 8/2018 |
| CN | 108766744 | * | 11/2018 |
| CN | 108766744 A | | 11/2018 |
| WO | 2021165086 A1 | | 8/2021 |

OTHER PUBLICATIONS

Supplementary European Search Report for EP Application No. 20 95 0775 mailed Jun. 18, 2024 (14 pages).

* cited by examiner

MEDICAL DEVICE WIRELESS CHARGING SYSTEM

This application is a National Stage Application of PCT/CN2020/112037 filed Aug. 28, 2020, which application is incorporated herein by reference. To the extent appropriate, a claim of priority is made to the above disclosed application.

BACKGROUND

The present disclosure relates generally to medical devices and, more particularly, to a battery charging system for wirelessly charging batteries across a sterile barrier in a medical environment.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Medical environments such as hospitals, surgery centers, urgent care centers, clinical care centers, and others utilize batteries to power devices such as scopes, cameras, surgical tools, and various powered tools and accessories. Battery-powered devices may be operated without the space and range constraints associated with using a power cable. Often these devices need to be cleaned, sanitized, or sterilized prior to use or between uses. Recharging or replacing the batteries in these devices presents a challenge in medical environments. For example, certain medical devices are powered by disposable batteries that need to be replaced at regular intervals and that create additional waste that may need to be disposed per hospital waste guidelines. Further, replacing a battery during use in a patient may require additional steps within a sterile field.

SUMMARY

Certain embodiments commensurate in scope with the originally claimed subject matter are summarized below. These embodiments are not intended to limit the scope of the disclosure. Indeed, the present disclosure may encompass a variety of forms that may be similar to or different from the embodiments set forth below.

In an embodiment, a wireless charging system for recharging batteries in a medical environment is provided that includes a charging station and at least two rechargeable batteries. The charging station includes a housing comprising an inlet for batteries at a top of the housing, an outlet for charged batteries below the inlet, and a vertical channel extending between the inlet and outlet; a wireless power transmitter inside the housing, wherein the wireless power transmitter comprises a transmitting antenna comprising a plurality of turns of transmitting coil configured to generate a magnetic field, wherein the plurality of turns of transmitting coil are formed by a wire distributed in a rectangular spiral on a first surface of the substrate; and a metallic sheet (e.g., ferrite sheet) disposed on a second surface of the substrate opposing the first surface, wherein the metallic sheet increases a transmissivity of the plurality of transmitting coils. Each rechargeable battery includes a receiving antenna, wherein an outer perimeter of the transmitting antenna has a long dimension and a short dimension and outer perimeter of the receiving antenna comprises a long dimension and a short dimension. The long dimension of the receiving antenna is less than 50% of the long dimension of the transmitting antenna, and wherein a receiving antenna surface area measured using the long dimension and the short dimension of the receiving antenna is less than 25% of a transmitting antenna surface area measured using the long dimension and a short dimension of the transmitting antenna.

In an embodiment, a wireless charging station for recharging batteries in a medical environment is provided that includes a housing comprising an inlet to receive batteries at a top of the housing, an outlet for charged batteries below the inlet, and a vertical channel extending between the inlet and outlet and a power supply connected to the housing. The charging station includes a wireless power transmitter inside the housing and coupled to the power supply, wherein the wireless power transmitter comprises a transmitting antenna comprising a plurality of transmitting coils configured to generate a magnetic field, wherein the plurality of transmitting coils are formed by a wire distributed on a substrate and arranged into 10 or fewer individual coils having a rectangular shape, wherein a length-to-width ratio of each rectangular shape is between about 1.5:1 and about 2.5:1, and wherein a transmission efficiency of the wireless power transmitter is at least 40% at a 20 mm distance spaced apart from the substrate to transfer power to a battery.

In an embodiment, a wireless charging system for recharging batteries in a medical environment is provided that includes a charging station. The charging station includes a wireless power transmitter, wherein the wireless power transmitter comprises a transmitting antenna comprising a plurality of transmitting coils configured to generate a magnetic field, wherein the plurality of transmitting coils are formed by a wire distributed on a substrate and arranged into coils having a rectangular shape, the transmitting antenna comprising an outermost long side and an outermost short side having a first ratio of about 2:1 or less. The system also includes a rechargeable battery including a power receiver, the power receiver including a receiving antenna comprising an outermost long side and an outermost short side having a second ratio of about 3:1 or greater.

Features in one aspect or embodiment may be applied as features in any other aspect or embodiment, in any appropriate combination.

BRIEF DESCRIPTION OF THE DRAWINGS

Advantages of the disclosed techniques may become apparent upon reading the following detailed description and upon reference to the drawings in which.

DETAILED DESCRIPTION OF SPECIFIC EMBODIMENTS

Figure 3:
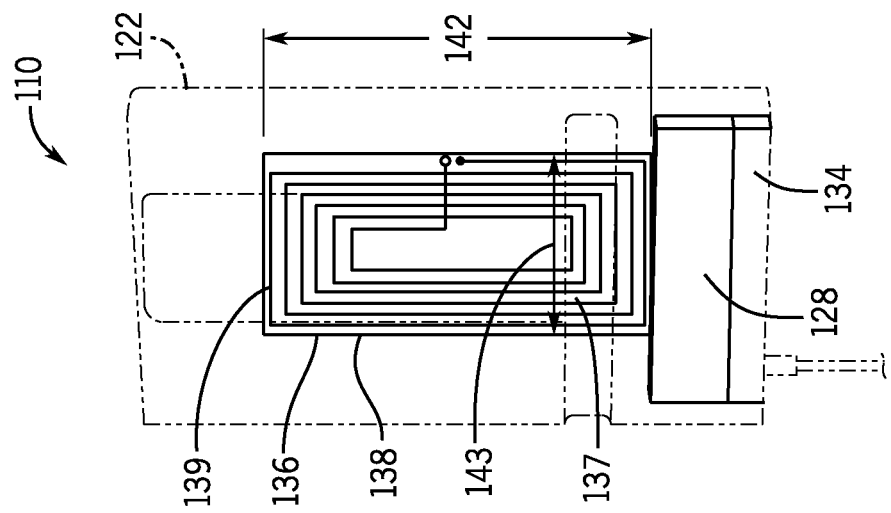
FIG. 3 is a perspective view of internal components of the charging station of FIG. 1, according to an embodiment of the present disclosure.

Certain examples commensurate in scope with the originally claimed subject matter are discussed below. These examples are not intended to limit the scope of the disclosure. Indeed, the present disclosure may encompass a variety of forms that may be similar to or different from the examples set forth below.

Portable medical device use is expanding with advancements in wireless technologies. The healthcare industry has widely embraced portable medical devices. For instance, a portable video laryngoscope is a type of medical device used in a medical procedure to provide a view into a patient's airway during tracheal intubation. The video laryngoscope is a form of indirect laryngoscopy in which a medical professional (such as a doctor, therapist, nurse, or other practitioner) does not directly view patient's larynx. Instead, visualization of the patient's larynx is performed with a fiberoptic or digital laryngoscope inserted transnasally or transorally. In operation, the portable video laryngoscope may operate under battery power from a rechargeable battery, which provides power to the laryngoscope display, the laryngoscope camera, a light source, and other functions of the video laryngoscope. While certain embodiments of the present disclosure are discussed in the context of rechargeable batteries of portable video laryngoscopes, it should be understood that the disclosed wireless charging system may be used in conjunction with other medical devices that use rechargeable batteries.

The present disclosure relates generally to a wireless charging system for charging batteries used in conjunction with portable medical devices and across a sterile barrier in a medical environment. The wireless charging system may use inductive coupling in which an electromagnetic field transfers energy between objects. The wireless charging system may include a power transmitter associated with a charging unit, e.g., a charging station, which transfers energy to one or more power receivers associated with respective rechargeable batteries. The disclosed configuration of the power transmitter facilitates generation of short-range electromagnetic energy fields in which the transmitted power decreases exponentially with distance. Accordingly, the transmitted power is relatively efficient at a target distance from the power transmitter and drops off to low levels at distances beyond the target distance. In this manner, effective power transmission can be achieved in a desired distance range.

The power transmitter may produce a strong near-distance magnetic field and transmit the magnetic field to the power receiver via a power transmitter antenna. The power receiver may receive the transmitted magnetic field via a power receiver antenna and convert the magnetic field back to electrical power. The converted electrical power from the power receiver may charge multiple rechargeable batteries (e.g., lithium batteries) simultaneously with high efficiency of user practice (e.g., more than hundreds of charge/discharge cycles). The use of wireless technology eliminates certain configurations with charging port extending through a device (or battery pack) housing, permitting a battery enclosure to cover internal metal or electrical components, avoiding potential leakage, and improving water resistance and sterile characteristics.

The wireless charging system of present disclosure may provide efficient charging at a wider charging distance (e.g., up to 50 watts at a distance up to 5 cm) between the charger and batteries and using a single charger (e.g., a power transmitter) capable of charging multiple batteries (e.g., up to 8 battery units) simultaneously. The relative position of the power transmitter and the multiple receivers while charging is relatively flexible. Accordingly, the respective power receiver of the batteries can be arranged in any position relative to the power transmitter as well as to one another, which permits more rapid and user-friendly loading of the charging station. In an embodiment, the wireless charging system of present disclosure may be based on wireless charging technologies such as Alliance for Wireless Power (A4WP) standard.

Figure 1:
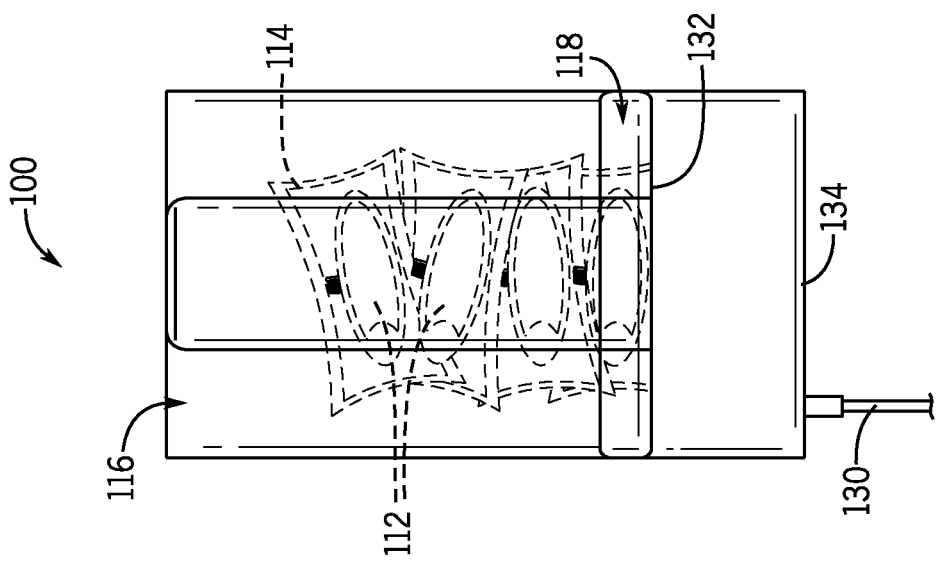
FIG. 1 is a perspective view of a wireless charging system including a charging station and several rechargeable batteries, according to an embodiment of the present disclosure.

With the forgoing in mind, turning now to the figures, FIG. 1 is a perspective view of a wireless charging system 100. The wireless charging system 100 includes a charging station 110 and several rechargeable batteries 112. Each battery may be sealed inside a sterile barrier 114. The charging station 110 may transmit power wirelessly in the form of a magnetic field to the batteries 112 across the sterile barrier 114, so that the batteries may not need to be sterilized again after charging. The batteries enter the charging station 110 through an inlet 116 at the top and then exit the charging station 110 through an outlet 118 at the bottom in a first-in first-out order, such that the battery that entered first exits first. This ordering mechanism provides batteries in order of the amount of time they have spent inside the charging station 110, reducing the chance that a battery is removed from the station before the battery has had time to charge. As shown in FIG. 1, the batteries 112 are oriented horizontally inside the charging station 110, forming a vertical stack of batteries (e.g., in a wall-mounted charging station) that move from the inlet 116 toward the outlet 118 as batteries at the outlet are taken out for use. The batteries 112 may receive power wirelessly from the charging station 110 regardless of their orientation inside the charging station 110, therefore charging the batteries 112 inside the charging station 110 may not dependent on a particular orientation (turned, tilted, rotated, and the like) of the batteries 112 relative to the charging station 110 and relative to each other.

In an embodiment, the sterile barrier 114 may be a plastic or paper pouch that is sealed around the battery 112 such as by vacuum or heat sealing, creating a sterile single or double barrier with the battery 112 inside. The sterile barrier 114 may be compatible with sterilization methods (such as chemical, temperature, or radiation methods) and does not block the magnetic charging field from a wireless power transmitter.

Although four rechargeable batteries 112 are shown in FIG. 1, in other embodiments, different numbers of batteries 112 may be charged simultaneously, such as two, three, five, six, seven, eight, nine, ten, or more batteries 112.

Figure 2:
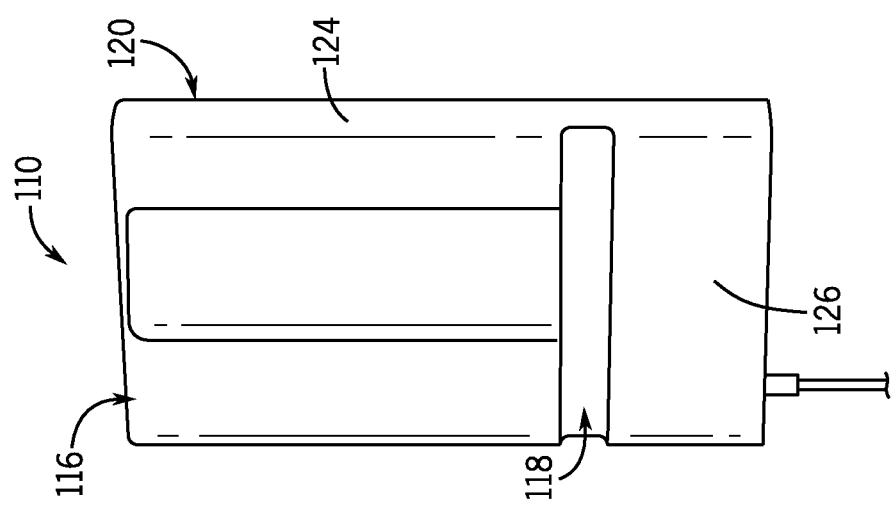
FIG. 2 is a front view of the charging station of FIG. 1, according to an embodiment of the present disclosure.

The charging station 110 is also shown in FIGS. 2-3. FIG. 2 shows a front view of the charging station 110. In an embodiment, the charging station 110 may include a housing 120 with a rear plate 122, a front cover 124, and a base 126.

The base 126 may include or may be attached to a power supply such as a battery, a power generator, or a power cord 130 (which attaches to an external power supply such as a wall outlet). The inlet 116 may be an opening formed between the front cover 124 and the rear plate 122. The outlet 118 may be formed as a horizontal slot in the front cover, below the inlet 116 and above the base 126. The top of the base 126 may also serve as a tray 132 on which the batteries 112 rest. The housing 120 may also include an indicator light 134, such as a horizontal light bar, LED light or strip, or other suitable visible indicators. As shown in FIGS. 1-3, the indicator light 134 is a horizontal light bar at the bottom of the base 126.

In an embodiment, the indicator light 134 may be illuminated in a first state, such as a solid first color. This first color may be white, green, blue, or other colors, and the solid state means the color is not blinking. The first state of the indicator light 134 may mean the charging station 110 is turned on and operating normally. In some case, the indicator light 134 may change to a second state (e.g., a second color such as red, orange, yellow, or other colors) and may flash. The second state may indicate an error state, to alert users that the charging station 110 may not operate correctly. The indicator light 134 may change to a third state (e.g., with no light turned on), meaning that the charging station 110 may not be powered on. Different combinations of colors, blinking patterns, and visible indications (e.g., brightness) corresponding to various system states may be used to communicate information to the user.

In operation, the wireless charging system 100 may be used for wirelessly charging a battery (e.g., the battery 112) for a medical device. In an embodiment, the medial device may be a video laryngoscope. In the present embodiment, the battery 112 is a battery for the video laryngoscope. After being charged, the battery 112 is removed from the outlet 118 of the charging station 110. The battery 112 is then removed from the sterile barrier 114, for insertion into the video laryngoscope. With the video laryngoscope loaded with the battery 112, the medical professional may use the video laryngoscope in a medical procedure (such as an intubation-inserting an endotracheal tube or other airway device into a patient's airway passages such as a trachea). During or after the medical procedure, the battery 112 may be decontaminated. The battery 112 may be cleaned (e.g., with a cleaning solution) or sterilized during and/or after the medical procedure. After cleaning or sterilization, the battery 112 may be placed inside the sterile barrier 114 and sealed. The depleted battery sealed in the sterile barrier 114 is then placed back through an inlet 116 into the top of the charging station 110, where the battery 112 passes through the charging field in the vertical stack of batteries and receives power from the charging station 110 wirelessly. The battery 112 may emerge at the outlet 118 in a charged state and the cycle repeats as described above.

It should be appreciated that the batteries 112 may be received into the inlet 116 of the charging station 110 in any state-charged, partially charged, or depleted. Depending on a medical environment where they may be used, the batteries 112 may be fully depleted before they are decontaminated and returned to the charging station 110, or they may be only partially depleted. In an embodiment, an intubation performed with a video laryngoscope may deplete the battery 112 only partially, and the battery 112 is then cleaned or sterilized, placed inside the sterile barrier 114 and sealed, placed back into the charging station 110, and charged back to full. If a particular video laryngoscopy procedure takes a longer amount of time, for example, the battery 112 in use may be partially or fully depleted. The charging station 110 may accept multiple batteries in any of these conditions, for charging back to full.

Further, the wireless charging system 100 may be used for wirelessly recharging multiple batteries 112 each sealed inside a corresponding sterile barrier, respectively by transmitting power wirelessly to a first battery 112 through the first sterile barrier and simultaneously transmitting power wirelessly to the second battery through the second sterile barrier, such that both batteries are charging at the same time. The method may further include providing the first battery in a charged state through the outlet 118 at a bottom of the charging station 110, and subsequently, providing the second battery in a charged state through the outlet 118.

FIG. 3 shows some internal components of the charging station 110. A wireless power transmitter 136 may be located on or inside the rear plate 122. In an embodiment, the wireless power transmitter 136 may include a power transmitting antenna 137 formed on a substrate 138, which may be a printed circuit board assembly. The charging station 110 may also include a main board 128 in the base 126. The main board 128 may include a processor, memory, and other components for operating the charging station 110.

The wireless power transmitter 136 may transmit power wirelessly to the batteries 112 inside the charging station 110. As shown in more detail in FIG. 4 (and described below), each battery 112 may include a wireless power receiver 140 having a receiving antenna 141, that receives the wirelessly transmitted power and stores it in a battery cell 145. The wireless power transmitter 136 may be designed to send power wirelessly to multiple batteries 112 at the same time. Referring to FIGS. 1-3, in an embodiment, the charging station 110 may charge at least four batteries 112 simultaneously. The charging station 110 may have a shape that is large enough to contain at least four batteries 112 inside the charging station 110, and the wireless power transmitter 136 may be sized to transmit power to these four batteries 112 simultaneously, so that the four batteries 112 may all receive power at the same time.

Certain charging characteristic of the charging station 110 are functions of the relative sizing of the wireless power transmitter 136 and the wireless power receivers 140. In an embodiment, both the wireless power transmitter 136 and the wireless power receiver or receivers 140 may be elongated, meaning that they have one dimension longer than the other. The wireless power transmitter 136 may be oriented inside the rear plate 122 such that a first or long dimension 142 is vertical, and a second or short dimension 143 is horizontal. The disclosed shape and configuration of the wireless power transmitter 136 creates a charging field (such as a magnetic field) inside the charging station 110, and the batteries 112 are within and/or pass through the charging field as they are in the charging station 110.

In an embodiment, the batteries 112 may be oriented such that their longer dimension is generally horizontal (see FIG. 1). This may enable at least four batteries 112 to fit inside the charging field created by the wireless power transmitter 136. However, the batteries 112 may receive charge in any orientation inside the charging field. The battery 112 may be rotated or turned in any orientation inside the charging station 110 and still effectively receive power to charge the battery. As shown in FIG. 1, the batteries 112 in the stack of batteries may be tilted in different directions, away from horizontal, and they may all receiving power simultaneously. The batteries 112 may not need to be aligned in a particular way in order to receive charge in the charging station 110. They may face in toward the rear plate 122 or out toward the front cover 124. In an embodiment, the charging station 110 may be sized and shaped to receive the batteries 112 in a generally horizontal orientation so that the batteries 112 may rest in a vertical stack inside the charging station 110 and arrive at the outlet 118 in a first-in first-out order. However, if a battery moves through the charging station 110 in a different orientation (vertical, or tilted), it may still receive power. The batteries 112 may be dropped into the charging station 110 quickly and easily, without needing to be precisely aligned.

Figure 4:
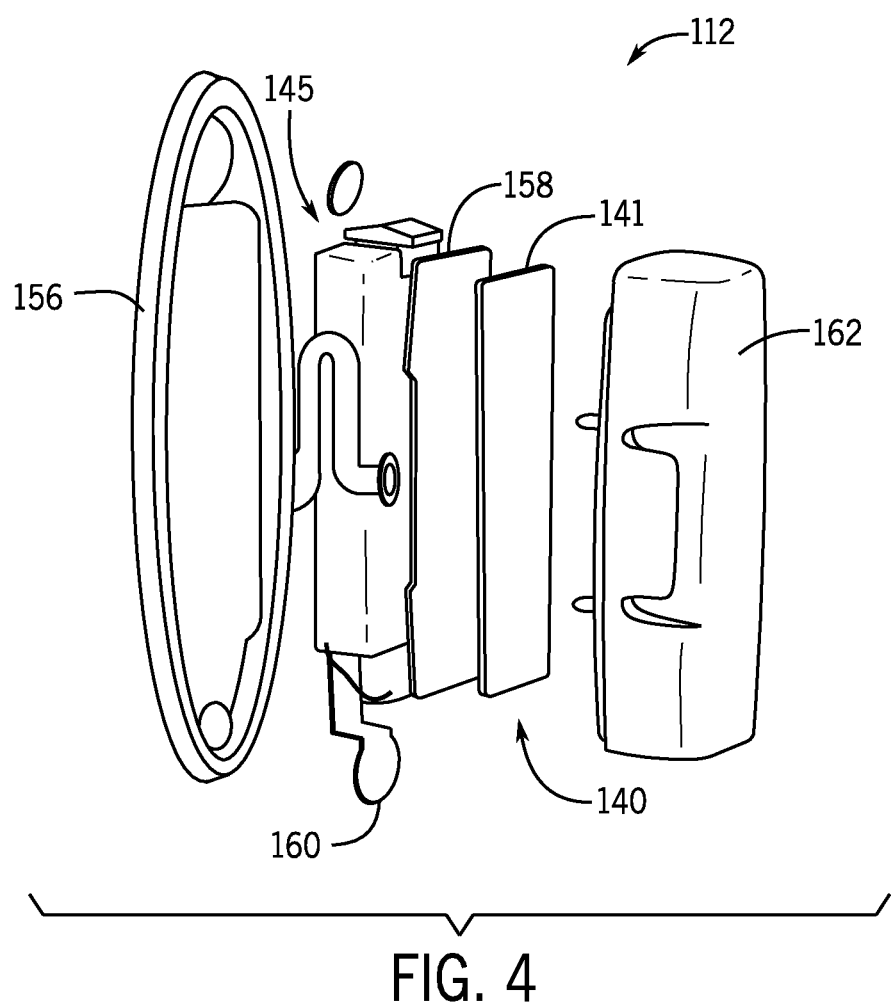
FIG. 4 is an exploded view of the rechargeable battery of FIG. 1, according to an embodiment of the present disclosure.

FIG. 4 shows an exploded view of one of the batteries 112. In an embodiment, the battery 112 is a re-chargeable battery (e.g., lead-acid, nickel-cadmium (NiCd), nickel-metal hydride (NiMH), lithium-ion (Li-ion), lithium-ion polymer (LiPo), or rechargeable alkaline battery), meaning it can be charged again after is has been depleted. As mentioned previously, the battery 112 may include the wireless power receiver 140 including a printed circuit board with the receiving antenna 141. The wireless power receiver 140 may be coupled to the battery cell 145 which stores the received power. In an embodiment, the battery cell 145 may a lithium cell. The battery 112 may also include a top case or cover 156, a main printed circuit board 158, a flex circuit 160, and a rear case or cover 162, among other components. In an embodiment, an indicator light (e.g., light emitting diode (LED)) may be carried by the flex circuit 160 and visible through the front case 156. The indicator light may show a state of charging (e.g., in-charging, fully charged, malfunctioning, or the like) of the batteries 112 using a variety of indications such as color, blinking pattern, brightness, or combinations of visual indications.

Figure 5:
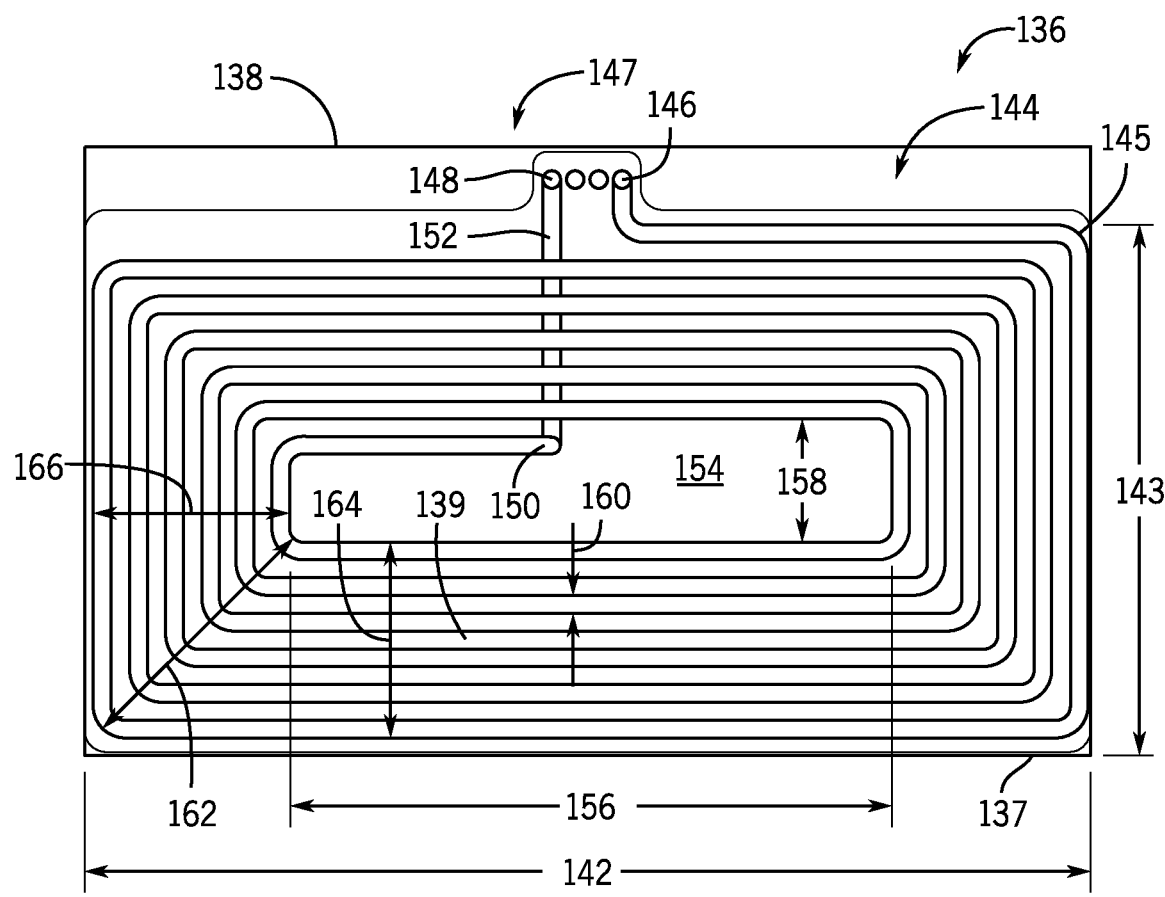
FIG. 5 is a top view of a power transmitter antenna, according to an embodiment of the present disclosure.

With the preceding in mind, FIG. 5 is a top view of a power transmitter unit antenna such as the transmitting antenna 137 described in FIG. 3. The transmitting antenna 137 is part of the wireless power transmitter 136 coupled to the housing 120 of the charging station 110. The transmitting antenna 137 may include multiple transmitting coils to generate a magnetic field (see FIG. 8). The multiple transmitting coils may be formed by a wire 139 distributed on a surface 144 (e.g., a first surface, a planar surface) of the substrate 138 and assuming a series of coils of progressively smaller shapes. The transmitting antenna 137 may be characterized as a rectangular spiral in which a wire is coiled in a series of progressively smaller rectangular shapes towards a center of the spiral. The wire 139 may be a single continuous wire. The substrate 138 may be a type of printed circuit board substrate that holds circuit traces and components on the printed circuit board, providing mechanical support, protection, and electrical interconnection and/or insulation.

The transmitting antenna 137 may be characterized by the first dimension 142 and the second dimension 143, representing an outermost length and an outermost width of the transmitting antenna 137, respectively. In present example, the first dimension 142 is larger than the second dimension 143 such that a length-to-width ratio is greater than 1 (e.g., 1.5, 2, 3, or higher). In one embodiment, the length-to-width ratio of the first dimension 142 and the second dimension 143 is between about 1.5:1 to about 2.5:1, between about 1.75:1 to about 2.25:1, between about 1.5:1 to about 2:1, or between about 2:1 to about 2.5:1

Dimensions of the transmitting coils become progressively smaller as the transmitting coils are distributed inward on the substrate. The progressively smaller shapes may include a series of rectangles, such as a first rectangle having a first area and a second rectangle having a second area smaller than the first area. In real applications, the series of rectangles may be rounded at their corners 145. As illustrated, the wire 139 may enter or be coupled to the surface 144 of the substrate 138 at a first location 146 adjacent to an edge 147 of the substrate 138 and exits the substrate 138 at a second location 148 adjacent to the edge 147 of the substrate 138. The first location 146 and the second location 148 are spaced apart from one another and, it should be understood, may be exchanged in other arrangements of the transmitting antenna 137. After forming the innermost rectangle (with the smallest dimensions), the wire 139 may turn 150 at a location that represents an end of the rectangular spiral. The turn 150 is coupled to a section 152 crossing (passing under or over) multiple long sides of the series of rectangles oriented along the long dimension 142 and extending between the turn 150 and the second location 148. The turn 150 is positioned such that the transmitting antenna 137 forms a region 154 on the surface 144 that is generally free from the wire 139. The surface area of the transmitting antenna 137 on the surface 144, as provided herein, may be characterized by a product of the long dimension 142 and the short dimension 143 of an outer perimeter of the transmitting antenna 137. In an embodiment, the surface area of the transmitting antenna 137 may also be measured as the area inside or encompassed by the outermost rectangle at a perimeter, including any irregular regions formed by bulges or rounded corners.

The surface area or approximate surface area of the region 154 may be characterized by multiplying a long dimension 156 (across the region 154 between wires 139) by a short dimension 158 (across the region that is orthogonal to the long dimension 156). The long dimension 156 and the short dimension 158, as illustrated in FIG. 5, may be a longest available stretch across the region 154, and the surface area of the region 154 may correspond to a rectangle extrapolated from the long dimension 156 short dimension 158. The surface area of the region 154 may be the area encompassed by the innermost transmitting coils. In an embodiment, the surface area of the region 154 is less than 50%, less than 40%, less than 30%, less than 25%, less than 20%, or less than 10% of the overall surface area of the transmitting antenna 137. The empty volume may help dissipate heat generated during wireless charging the battery 112 using the charging station 110.

Additional shape configurations include spacing 160 between adjacent section of wire 139, a distance 162 connecting adjacent corners 145, distances 164, 166 between outermost and innermost wires 139 along each side, and a number of corners 145, which represents a number of turns or windings. In the present example, six rectangles (referred to as 6 turns) are distributed on the substrate of the printed circuit board 138. The largest (extrapolated) rectangle has the first dimension 142 and the second dimension 143. As the rectangles are distributed inward, the dimensions of the rectangles become smaller. A length-to-width ratio of each individual rectangle is about 2:1. The multiple transmitting coils may have 20 or fewer turns or 10 or fewer turns (e.g., 6 turns, as illustrated), or between 5-10 turns. In an embodiment, the distances represented by reference numerals 162, 164, 166 are less than the long dimension 156 and greater than the short dimension 158 of the region 154. Further, the spacing 160 between adjacent coils of the wires 139, along the long dimension 142 or the short dimension 143, is less than 50% or 25% of the short dimension 158 of the region 154 in an embodiment.

The relationships between the distances and spacing influences the overall power transmitting efficiency. For example, in the disclosed embodiment, the transmitting antenna has high power transmitting efficiency at target distances spaced apart from the surface 144 as provided herein. In an embodiment, an effective power transmission range of the transmitting antenna 137 may be efficient at a target distance of 20 mm in a vertical direction that is perpendicular to the substrate 138 or 20 mm spaced apart from the surface 144. That is, the transmission efficiency of the wireless power transmitter 136 may be at least 40% at a 20 mm distance spaced apart from the substrate 138. The wireless power transmitter 136 may produce a strong near-distance magnetic field (e.g., 5 watts) and transmit the magnetic field to a power receiving unit (e.g., the wireless power receiver 140) that is placed within the effective power transmission range of the transmitting antenna 137. A physical charge area of the transmitting antenna 137 may be designed as a rectangle shape with specific length-width ratio (e.g., between about 1.5:1 to about 2.5:1) and with fewer than 10 turns (e.g., 6 turns, as illustrated in FIG. 5)

Figure 6:
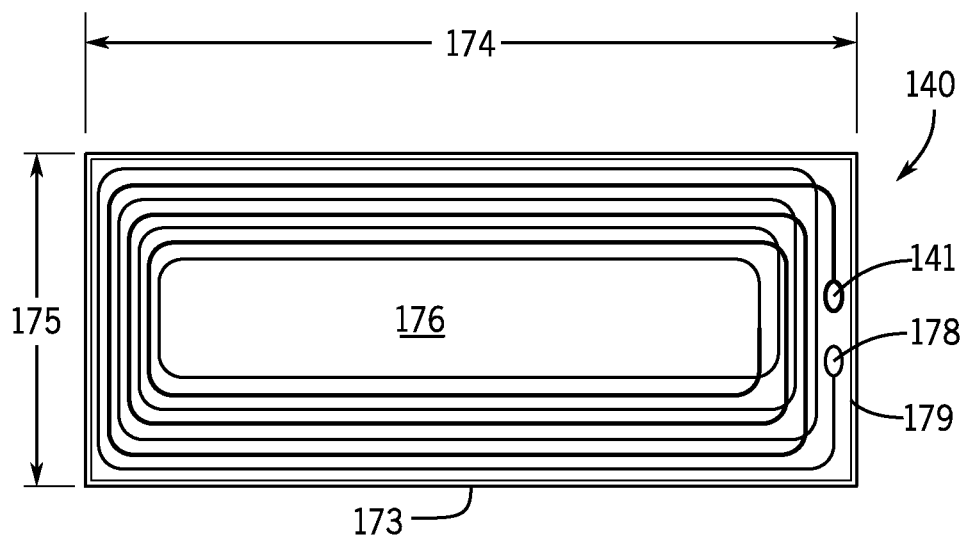
FIG. 6 is a top view of a power receiver antenna, according to an embodiment of the present disclosure.

FIG. 6 shows a top view of a power receiver unit antenna such as the receiving antenna 141 of the battery 112, as shown in FIG. 4. As stated previously, the receiving antenna 141 is part of the wireless power receiver 140 placed inside the battery 112. The receiving antenna 141 may include multiple receiving coils to receive a magnetic field (e.g., the magnetic field 185 of FIG. 8). The multiple receiving coils may be formed by a wire 173 distributed on a substrate and assuming a series of coils of progressively smaller shapes. The wire 173 may be a single continuous wire.

Dimensions of the receiving coils become progressively smaller as the receiving coils distributed inward on the substrate. The progressively smaller shapes may include a series of rectangles, such as a first rectangle having a first area and a second rectangle having a second area smaller than the first area. In real applications, the series of rectangles may be rounded at their corners. In the present example, the shape of the receiving antenna 141 may be designed as a rectangle having a long outermost dimension 174 and a short outermost dimension 175 at an outer perimeter. The receiving antenna 141 may also be wound with 5-10 turns (e.g., 7 turns, as illustrated in FIG. 6) and may form a generally open region 176 in a center.

The wire 173 may having coupling (entry and exit) points adjacent to an edge 178 of a substrate 179 on which the wire 173 is distributed. The multiple receiving coils may be formed in a similar or different configuration in comparison with the multiple transmitting coils of the transmitting antenna 137. In an It should be appreciated that the shape of the transmitting antenna 137 or the receiving antenna 141 may be any suitable shape such as a rectangle, oval, circle, or the like. In an embodiment, the transmitting antenna 137 and the receiving antenna 141 have a same general shape (e.g., both rectangles), but are different sizes relative to one another, with the receiving antenna 141 being smaller than the transmitting antenna 137 to permit multiple receiving antennas 141 to be operatively coupled to the transmitting antenna to receive power. Further, a relationship between long and short dimensions (dimension 142 to dimension 143 and dimension 174 to dimension 175) of the respective antennas may be within a particular range. In an embodiment, the long dimension 174 to short dimension 175 ratio of the receiving antenna 141 is greater than that of the transmitting antenna 137. That is, the receiving antenna 141 may be generally elongated, having a longer ratio between sides than the transmitting antenna 137. In an embodiment, the long dimension 174 to short dimension 175 ratio of the receiving antenna 141 is at least 2.5:1 or at least 3:1 while the ratio of the long dimension 142 to the short dimension 143 is less than 2.5:1 or less than 2:1. The long dimension 174 may be less than 50%, less than 35%, or less than 30% of the long dimension 142. The short dimension 175 may be less than 25%, less than 20%, or less than 15% of the short dimension 143.

In an embodiment, the short dimension 143 of the transmitting antenna 137 of the wireless power transmitter 136 may be longer than the longest dimension 174 of the receiving antenna 141 in the battery 112. The area (e.g., the surface area) of the receiving antenna 141 may be less than 25%, less than 10%, or less than 5% of the area of the transmitting antenna 137. This shape may create a charging field that is bigger than the receiving antenna 141, and the battery 112 may receive charge in any orientation inside the charging station 110. In an embodiment, a receiving antenna surface area measured using the long dimension 174 and the short dimension 175 of the receiving antenna 141 is less than 1000 mm$^2$ and a transmitting antenna surface area measured using the long dimension 142 and the short dimension 143 of the transmitting antenna 137 is greater than 10,000 mm$^2$ and less than 20,000 mm$^2$.

Figure 7:
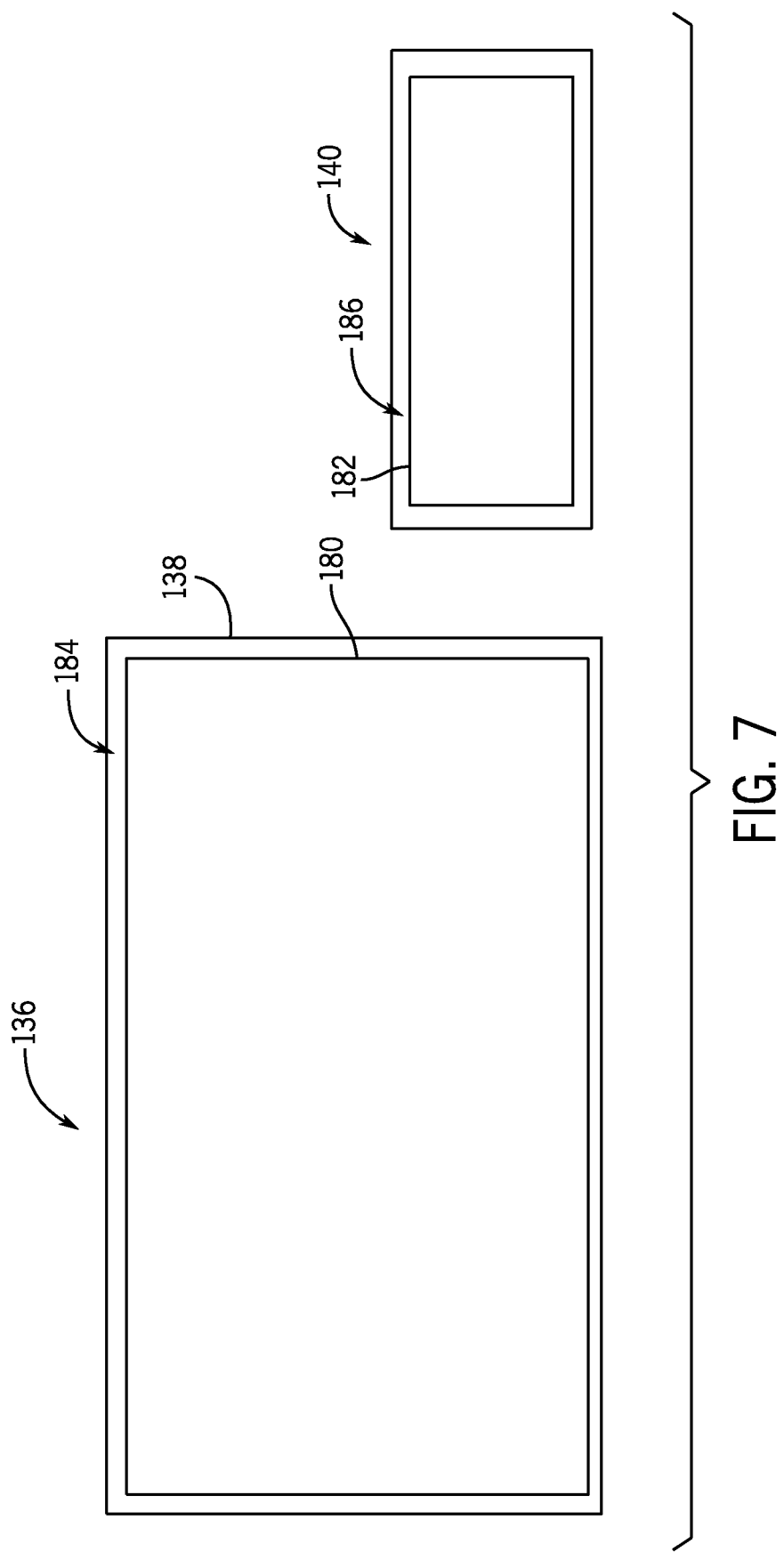
FIG. 7 is a bottom view of the power transmitter antenna and the power receiver antenna with adhesive ferrite sheets, according to an embodiment of the present disclosure.

With the foregoing in mind, FIG. 7 shows a bottom view of the power transmitting antenna 137 and the power receiving antenna 141 described above. In this embodiment, the wireless power transmitter 136 and/or the wireless power receiver 140 include a metallic sheet 180,182 (e.g., adhesive ferrite sheets). The wireless power transmitter 136 may include the metal sheet 180 disposed on a surface 184 of the substrate 138 opposing the wire 139 (see FIG. 5). The metallic sheet 180 may cover all or most of the surface 184, and the metallic sheet 182 may cover all or most of the surface 186 opposing the antenna-side surface of the power-receiving antenna. In an embodiment, the metallic sheet includes a cutout corresponding to the region 154 (FIG. 5) on the antenna-side surface to promote heat dissipation. The metallic sheets 180, 182 may increases a transmissivity (Quality factor or Q factor) of the transmitting coils and receiving coils. The metallic sheets 180, 182 may include adhesive ferrite sheets. The adhesive ferrite sheets may be made of soft ferrites with low coercivity and act as conductors of magnetic field for the power transmitter unit and power receiving unit antennas.

As discussed, the surface area of power receiving unit antenna may be relatively small in comparison with the surface area of the power transmitter unit antenna. The relationship between a size of the power receiving unit antenna and the power transmitting unit antenna is related to the wireless transfer efficiency. Additionally, as the power transmitter unit and power receiving unit antennas may be formed on a printed circuit board that may increase real parts of DC resistance of the power transmitter unit and power receiving unit antennas (e.g., $R_{1,2}$ in Equation 1). The increased impedances may increase heat converted from AC electric energy during wireless charging batteries. However, the benefits of using printed antenna traces on the printed circuit board assembly boards may be suitable and controllable for implementations (e.g., standardized mass production). In present embodiments, the additions of the metallic sheets 180, 182 (e.g., ferrite sheets with a good permeability) may increase the Quality factors of the power transmitter unit and power receiving unit antennas by reducing the DC impedances (e.g., $R_{1,2}$), therefore improving the wireless transfer efficiency n, as indicated in Equation (1). For example, the transmission efficiency of a wireless power transfer system, including 1 power transmitting unit and 4 power receiving units, may be increased up to 45% a 20 mm distance spaced apart from the substrate of the printed circuit boards.

Figure 8:
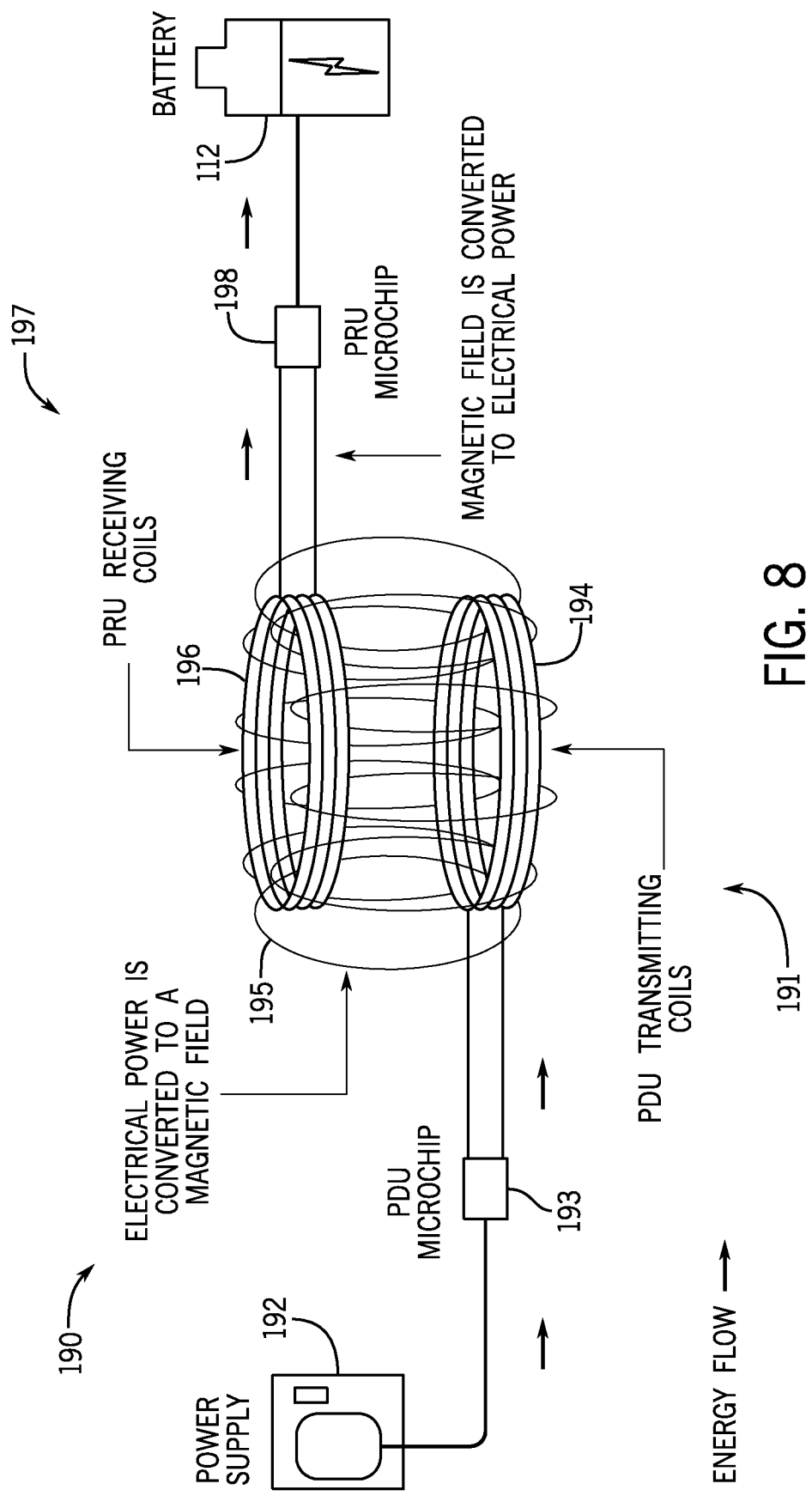
FIG. 8 is a schematic diagram of a wireless charging system, according to an embodiment of the present disclosure.

FIG. 8 is a schematic diagram of a wireless charging platform 190. The diagram shows the logic of wireless charging based on inductive power transferring. A power transmitter unit 191 may receive power from a power supply 192 (e.g., a wall outlet, a power generator, or other suitable power sources). With controls of a power driving unit microchip 193, the power transmitter unit 191 may use a power transmitter unit power driving circuitry (which will be detailed later in FIG. 9) to modulate the direct current (DC) power from its resonator to create alternating current (AC) power, and form a magnetic field 195 through a series of transmitting coils 194 (e.g., coils in the transmitting antenna 137).

Next, a power receiver unit 197 may receive a portion of the magnetic field 195 created by the power transmitter unit 191. For example, a series of receiving coils 196 (e.g., coils in the receiving antenna 140) may induce the magnetic field 195 according to the Faraday's law of electromagnetic induction. With controls of a power receiver unit microchip 198, a power receiving circuitry of the power receiver unit 197 (detailed in FIG. 10) may convert the AC power to DC power through multiple stages, such as impedance matching, rectification, amplification, filtering, DC/DC converting, modulating, and so on. An output voltage (e.g., 5V) may be used to power a charger to charge the battery 112 placed inside the charging station 110.

A wireless transfer efficiency η, as described in an Equation (1) shown below, may be used to evaluate inductive power transferring (or inductive coupling) between coils, such as the power driving unit transmitting coils 194 and corresponding power driving unit receiving coils 196 during a wireless charging process (e.g., charging the battery 112 using the charging station 110). The wireless transfer efficiency η depends on a coupling efficient k and a quality factor Q, as shown in Equation (1) below:

$$\eta = (1 - 1/_{kQ})^2 \text{ Where } Q_{1,2} = \omega L_{1,2}/R_{1,2}, \text{ and } Q = \sqrt{Q_1 Q_2} \quad \text{Equation (1)}$$

The coupling efficient k is a dimensionless parameter equal to the fraction of the magnetic field 195 through the power driving unit transmitting coils 194 that passes through the power receiver unit receiving coils 196. For example, if the power driving unit transmitting coils 194 and the power receiver unit receiving coils 196 are placed close within a certain range, the coupling efficient k may be close to 1. The quality factor Q may represent an electric energy storing capacity of the power driving unit transmitting coils 194 or the power receiver unit receiving coils 196. The quality factor Q depends on the frequencies ω, inductance L, and DC resistance R. For example, $L_1$ and $L_2$ are the inductances of power driving unit transmitting coils 194 and the power receiver unit receiving coils 196. Similarly, the $R_1$ and $R_2$ are the DC resistance of respective coils. The higher the coupling efficient k and/or the quality factor Q values, the higher wireless transfer efficiency η may be achieved by the power driving unit transmitting coils 194 and the power receiver unit receiving coils 196.

Figure 9:
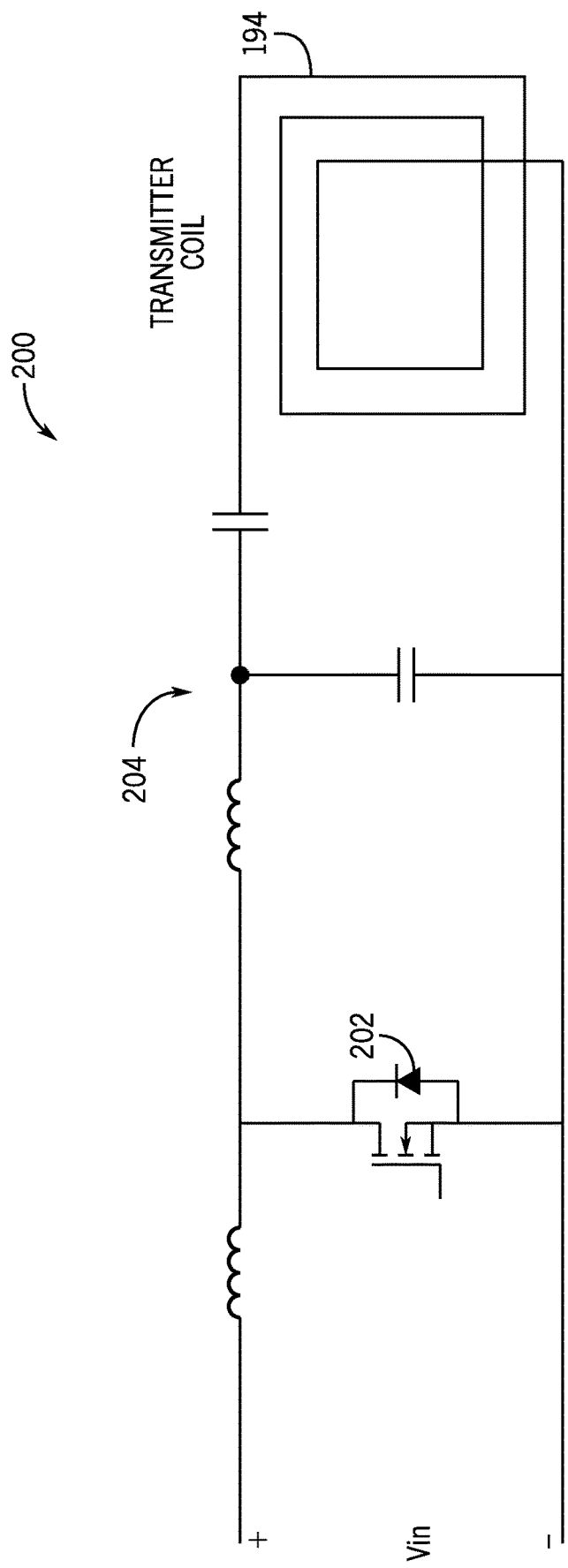
FIG. 9 is a schematic diagram of power driving circuitry of a power transmitter, according to an embodiment of the present disclosure.

FIG. 9 is a schematic diagram of a power transmitter unit power driving circuitry 200. As mentioned previously, the power transmitter unit power driving circuitry 200 may be used by the power transmitter unit 191 to modulate DC power from power transmitter unit resonator to create AC power and form the magnetic field 195 through the power transmitter unit transmitting coils 194. An input voltage Vin may provide a stable DC power, which is modulated by a driver 202. The driver 202 may generate pulsed driving signals (e.g., half-wave pulse signals) in specific frequencies within a frequency band (e.g., 6.765 MHz to 6.795 MHz). In an embodiment, the generated pulse signals may have frequencies centered at 6.78 MHz. Next, power driving unit impedance matching circuitry 204 may convert the driving signals to different type of signals (e.g., sinusoidal wave signals). The converted signals may be further amplified with suitable amplitudes for wireless power transmission by the power transmitter unit transmitting coils 194. The amplified signals may drive the power transmitter unit transmitting coils 194 to create the alternating AC power and form the magnetic field 195.

Figure 10:
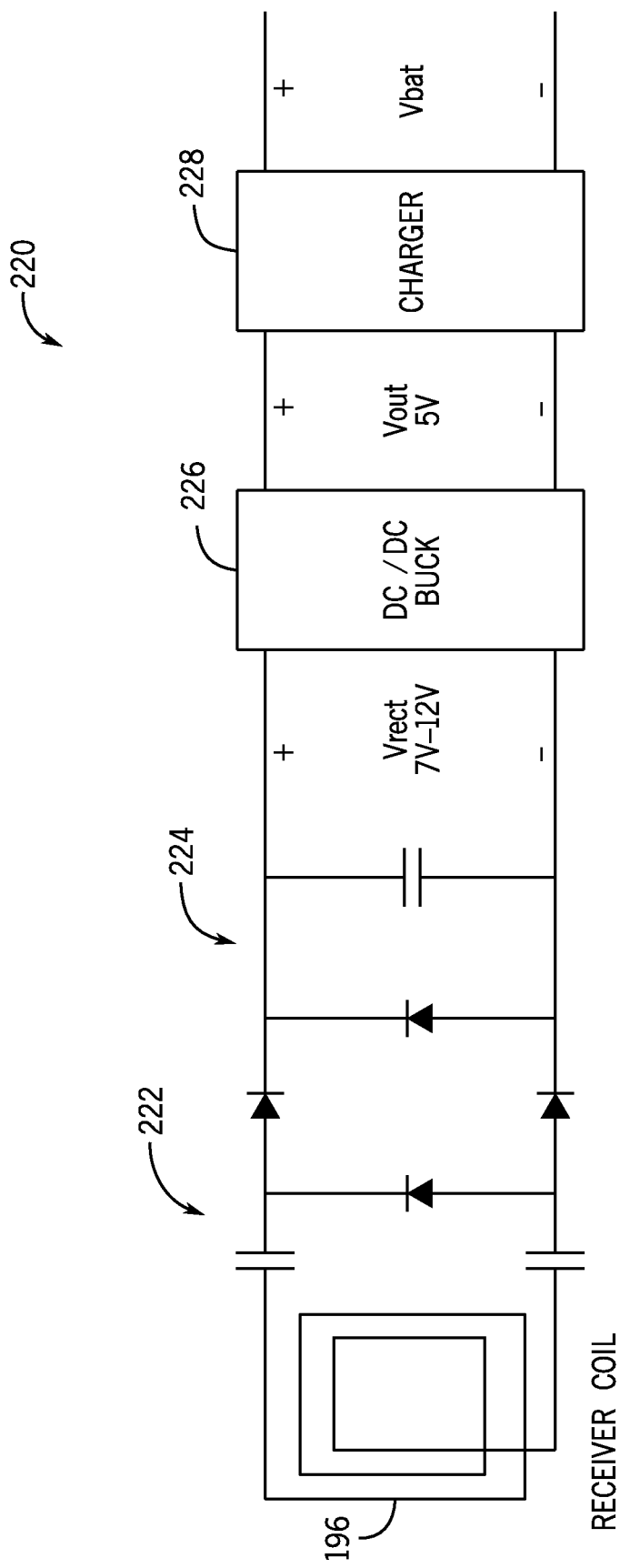
FIG. 10 is a schematic diagram of power receiving circuitry of a power receiving, according to an embodiment of the present disclosure.

FIG. 10 is a schematic diagram of power receiving circuitry 220. As mentioned previously, the power receiving circuitry 220 may be used by the power receiver unit 197 to receive a portion of the alternating AC power created by the power transmitter unit transmitting coils 194 and convert the received AC power to DC power through multiple stages, such as impedance matching, rectification, amplification, filtering, DC/DC converting, modulating, and so on. For example, a power receiver unit impedance matching circuit 222 may convert received alternating AC power to a different type of AC power (e.g., different wave). The converted AC power may pass through a rectifier bridge 224 to be converted to a DC power with a rectification voltage $V_{rect}$ in a suitable range (e.g., 7V-12V). The rectification voltage $V_{rect}$ may pass a DC/DC buck 226, which may be used to step-down the rectification voltage $V_{rect}$ to an output voltage $V_{out}$ at a lower value (e.g., 5V). The output voltage $V_{out}$ may then be used to power a charger 228. The charger 228 may modulate the output voltage $V_{out}$ to a suitable battery charge voltage Vbat to charge the battery 112 placed inside the charging station 110. The power receiver unit 197 may be tuned with a working frequency to be the same with the transmitting frequency (e.g., 6.78 MHz) of the power transmitter unit 191. By frequency tuning, a power receiver unit antenna (e.g., the receiving antenna 141) is matching and sensitive to the power transmitter unit antenna (e.g., the transmitting antenna 137).

While the disclosure may be susceptible to various modifications and alternative forms, specific embodiments have been shown by way of example in the drawings and have been described in detail herein. However, it should be understood that the embodiments provided herein are not intended to be limited to the particular forms disclosed. Rather, the various embodiments may cover all modifications, equivalents, and alternatives falling within the spirit and scope of the disclosure as defined by the following appended claims.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). For any claims containing elements designated in any other manner, however, it is intended that such elements are not to be interpreted under 35 U.S.C. 112 (f).

What is claimed is:

1. A wireless charging system for recharging batteries in a medical environment, comprising:
   a charging station comprising:
      a housing comprising an inlet for batteries at a top of the housing, an outlet for charged batteries below the inlet, and a vertical channel extending between the inlet and outlet, wherein the batteries received in the inlet fall through the vertical channel to the outlet;
      a wireless power transmitter inside the housing, wherein the wireless power transmitter comprises a transmitting antenna comprising a one or more transmitting coils configured to generate a magnetic field, wherein the one or more transmitting coils are formed by a wire distributed in a rectangular spiral on a first surface of the substrate; and
      a metallic sheet disposed on a second surface of the substrate opposing the first surface, wherein the metallic sheet increases a transmissivity of the one or more transmitting coils; and
   at least two rechargeable batteries disposed within the vertical channel, wherein each rechargeable battery comprises a receiving antenna, wherein an outer perimeter of the transmitting antenna comprises a long dimension and a short dimension, wherein an outer perimeter of the receiving antenna comprises a long dimension and a short dimension, wherein the long dimension of the receiving antenna is less than 50% of the long dimension of the transmitting antenna, and wherein a receiving antenna surface area measured using the long dimension and the short dimension of the receiving antenna is less than 25% of a transmitting antenna surface area measured using the long dimension and a short dimension of the transmitting antenna.

2. The wireless charging system of claim 1, wherein the wire is a single continuous wire.

3. The wireless charging system of claim 1, wherein the long dimension of the receiving antenna is less than 35% of the long dimension of the transmitting antenna and the short dimension of the receiving antenna is less than 20% of the short dimension of the transmitting antenna.

4. The wireless charging system of claim 1, wherein the rectangular spiral comprises at least 5 coils.

5. The wireless charging system of claim 1, wherein rectangles of the rectangular spiral are rounded at their corners.

6. The wireless charging system of claim 1, wherein the wire is arranged to cross or overlap multiple long sides of a series of rectangles of the rectangular spiral to extend between an innermost point of the rectangular spiral and a location on the first surface outside of the rectangular spiral.

7. The wireless charging system of claim 1, wherein the wire enters onto the first surface of the substrate adjacent to an edge of the substrate and exits the first surface of the substrate adjacent to the edge of the substrate.

8. The wireless charging system of claim 1, wherein the short dimension of the transmitting antenna is longer than the long dimension of the receiving antenna in each battery.

9. The wireless charging system of claim 8, wherein a first ratio of the long dimension to the short dimension of the transmitting antenna is less than a second ratio of the long dimension to the short dimension of the receiving antenna.

10. The wireless charging system of claim 9, wherein first ratio is less than 2.5:1 and the second ratio is greater than 3:1.

11. The wireless charging system of claim 10, wherein first ratio is less than 2:1.

12. The wireless charging system of claim 1, wherein the receiving antenna comprises a one or more receiving coils arranged a rectangular coil shape.

13. The wireless charging system of claim 1, wherein the receiving antenna surface area is less than 10% of the transmitting antenna surface area.

14. A wireless charging station for recharging batteries in a medical environment, comprising:
   a housing comprising an inlet to receive batteries at a top of the housing, an outlet for charged batteries below the inlet, and a vertical channel extending between the inlet and outlet, wherein the batteries received in the inlet fall through the vertical channel to the outlet;
   a power supply connected to the housing, and
   a wireless power transmitter inside the housing and coupled to the power supply, wherein the wireless power transmitter comprises a transmitting antenna comprising a plurality of transmitting coils configured to generate a magnetic field, wherein the plurality of transmitting coils are formed by a wire distributed on a substrate and arranged into 10 or fewer individual coils having a rectangular shape, wherein a length-to-width ratio of each rectangular shape is between about 1.5:1 and about 2.5:1, and wherein a transmission efficiency of the wireless power transmitter is at least 40% at a 20 mm distance spaced apart from the substrate to transfer power to a battery.

15. The wireless charging station of claim 14, wherein the transmitting antenna comprises 5, 6, 7, 8, 9, or 10 individual coils.

16. The wireless charging station of claim 14, wherein the transmitting antenna comprises an empty region in the middle of the substrate, wherein the empty region has a surface area less than 50% of a surface area of the transmitting antenna as measured using an outermost long side and outermost short side rectangle of the transmitting antenna.

17. The wireless charging station of claim 14, wherein the transmitting antenna comprises an empty region in the middle of the substrate, wherein the empty region has a surface area less than 25% of a surface area of the transmitting antenna as measured using an outermost long side and outermost short side rectangle of the transmitting antenna.

18. The wireless charging station of claim 14, comprising a metallic sheet disposed on the substrate on a surface opposing the transmitting antenna.

19. The wireless charging station of claim 18, wherein the metallic sheet is a ferrite sheet.

20. The wireless charging station of claim 18, wherein the metallic sheet comprises a cutout at an area corresponding to a center of the transmitting antenna.

* * * * *